Oct. 8, 1940.  W. W. MADISON  2,217,176
BRAKE WEAR INDICATING APPARATUS
Filed Aug. 15, 1938
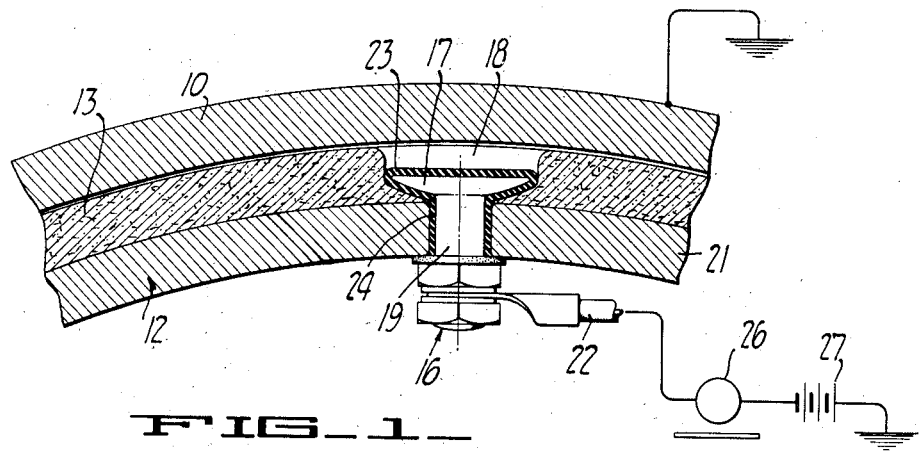
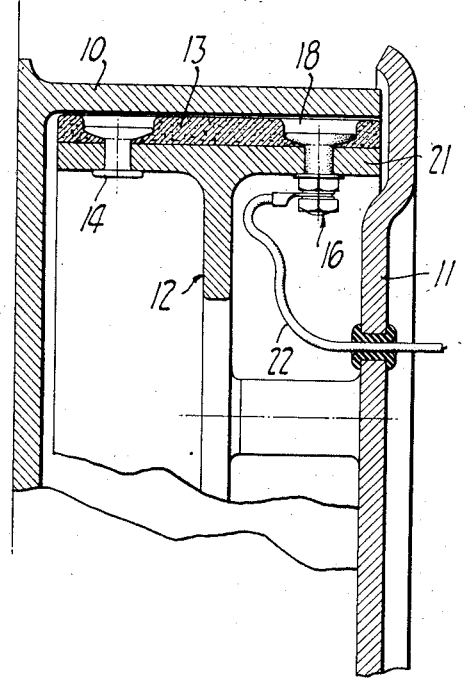
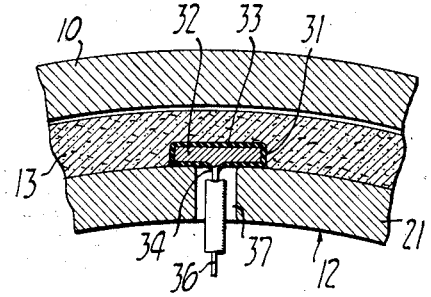
INVENTOR
Walter W. Madison
BY Paul D. Flehr
ATTORNEY Patented Oct. 8, 1940

2,217,176

UNITED STATES PATENT OFFICE 2,217,176

BRAKE WEAR INDICATING APPARATUS

Walter W. Madison, Berkeley, Calif.

Application August 15, 1938, Serial No. 224,945

3 Claims. (Cl. 200—52)

This invention relates generally to the construction of brakes such as are employed with automobiles, trucks, or other automotive vehicles. More particularly it relates to apparatus for indicating to an operator when a brake lining has been worn away to such an extent that it should be renewed.

It is a primary object of the invention to provide a device of the above character which can be readily incorporated in conjunction with any brake lining, and which will afford an effective warning when a lining has been worn to such an extent that it should be renewed. A further object of the invention is to afford such a device without interfering with proper attachment of a brake lining to its associated shoe, and without structurally weakening the brake lining.

A further object of the invention is to afford an arrangement of the above character which will make use of an electrical signalling circuit, without possibility however of any false signal or undesired leakage of current through the contacting means employed.

Further objects of the invention will appear from the following description in which the preferred embodiments of the invention have been set forth in detail in conjunction with the accompanying drawing.

Referring to the drawing:

Fig. 1 is an enlarged cross-sectional view, illustrating one manner in which my invention can be incorporated with a conventional type of brake lining.

Fig. 2 is a cross-sectional detail illustrating the shoe represented in Fig. 1, as applied to a brake drum.

Fig. 3 is an enlarged cross-sectional detail illustrating a modified form of the invention.

Referring first to Figs. 1 and 2 of the drawing, I have indicated a conventional form of automotive brake, including the brake drum 10 which is generally carried by the vehicle wheel, the cover plate 11 for the drum, and the brake shoe 12, of which two are usually employed. The brake shoes are movably carried by the plate 11, and are actuated by a suitable mechanical or hydraulic means from the brake pedal of the vehicle. The single shoe 12 illustrated in Fig. 2 is shown covered with a brake liner 13, which is generally in the form of a molded composition. It is customary in practice to attach the liners by means of a plurality of rivets 14.

Since the brake linings are generally mounted in such a way that they can not be readily inspected, there is no convenient way to determine the actual condition of the brake lining. Should the linings be worn away to an unsafe extent a failure may occur abruptly without warning. As a simple and effective means to indicate a predetermined amount of wear of the brake lining, I make use of a contacting member which in Figs. 1 and 2 is in the form of a metal stud 16. This stud may be similar in form and size, and may in fact take the place of one of the attaching studs 14. Thus the button-like head 17 of the stud is shown being seated in the opening 18 of the lining. The shank 19 of the stud is shown extending through the adjacent wall 21 of the shoe 12, where it forms an electrical terminal for connection with electrical conductor 22.

The head 17 of the stud is preferably provided with a covering 23 of insulating material, such as rubber. Also the shank 19 is shown provided with insulating material 24, in order to prevent short-circuiting against the metal of the shoe. The purpose of the insulating covering 23 is to prevent any leakage of current by virtue of accumulation of metal fragments in the opening 18, while the brake is in use. Also this insulation prevents any leakage of current through the liner, since the material of the liner may include reinforcing wire and partially conducting material such as carbon or graphite.

It is desirable to employ electrical indicating means connected to the stud 16, and for this purpose I have shown a signal lamp 26, one side of which is connected to the storage battery 27 of the car, while the other side is connected to conductor 22. Since one side of battery 27 is grounded and the brake drum 10 is likewise grounded, a circuit is formed which is completed through the lamp 26 when the end of stud 17 comes into direct electrical engagement with the drum 10.

Operation of the arrangement described above can be explained as follows: Ordinarily the circuit of lamp 26 is open, and there is no leakage whatsoever from the stud 16. When the lining 13 wears away to such an extent as to approach an unsafe thinness, the insulation 23 covering the end of the stud 16 is stripped away by engagement with the brake drum, whereby eventually the end of the stud comes into direct electrical engagement with the adjacent surface of the drum, during intervals when the brake is applied. This condition is immediately signalled to the operator by a flashing of the lamp 26.

In using my invention upon automobiles, it is unnecessary to equip each of the brakes with contacting studs. It will suffice if the lining of one brake is so equipped, since all of the linings wear at a substantially equal rate.

The embodiment described above with reference to Figs. 1 and 2 can be applied to various standard types of brake linings, at the time these linings are being attached to the brake shoes, or even after the lining has been in service. The arrangement illustrated in Fig. 3 can be supplied by a manufacturer and embodied as a permanent part of the liner. Thus in this case the inner face of the lining 13 is provided with a special recess 31, and within this recess there is a button-shaped contact member 32. This member can be made of suitable metal, such as copper or brass, and it is provided with a surfacing of insulating material 33. A tab or terminal 34 extends from one face of the button 32, and this tab can connect with a wire or conductor 36, which is accommodated by an opening 37 in the brake shoe. The operation of this embodiment is substantially the same as for Figs. 1 and 2. Installation of the lining in this instance may require the drilling of a hole through the brake shoe, in order to accommodate the wire 36, or if desired the button 32 can be located in such a manner that when installed with a given shoe the wire 36 can be extended through one of the regular rivet holes.

It will be evident from the foregoing description that my invention affords a device of great simplicity, which will give a positive warning signal when the brakes have been worn away to a predetermined extent. There is no danger of a false signal, and no danger of leakage of current from the battery, which might not be sufficient to illuminate the lamp but which if permitted to occur might serve as a detrimental drainage upon the battery. The brake lining is not structurally weakened, and after being worn away to such an extent as to afford an indication, it remains serviceable until repairs can be made.

I claim:

1. In combination with the lining of an automotive brake shoe, where one face of the lining is adapted to engage the face of a shoe and the other side forms a friction surface for engagement with a metal brake drum, a metal stud having one end of the same mounted within said lining, said stud serving as an attachment of the lining to the shoe and being electrically insulated from the lining and from the shoe, and one end of the face of said stud being intermediate the faces of the lining and making direct electrical engagement with the drum after a predetermined amount of the lining has been worn away in use whereby to close an electrical signalling circuit through said metal stud to indicate such engagement.

2. In combination with the lining of an automotive brake shoe, where one face of the lining is adapted to engage the shoe and the other face forms a friction surface for engagement with the metal drum, a button-like metal member mounted within the lining and electrically insulated from the lining and from the shoe, one face of said metal member being located intermediate the faces of the lining and closing an electrical indicating circuit through said metal member when a sufficient thickness of the lining has been worn away in use to permit direct electrical engagement of the said one face of the metal member with the brake drum.

3. In combination with the lining of an automotive brake shoe, where one face of the lining is adapted to engage the shoe and the other face forms a friction surface for engagement with the metal brake drum, a metal member mounted within the lining and having one face thereof located intermediate the faces of the lining, and means electrically insulating said metal member from the lining and from the shoe, the said metal member making direct electrical engagement with the drum after a predetermined amount of the lining has been worn away in use whereby to close an electrical signalling circuit through said member to indicate such engagement.

WALTER W. MADISON.